United States Patent
Elias (10) Patent No.: US 9,454,239 B2
(45) Date of Patent: *Sep. 27, 2016

(54) ENABLING TOUCH EVENTS ON A TOUCH SENSITIVE MECHANICAL KEYBOARD

(75) Inventor: John Greer Elias, Townsend, DE (US)

(73) Assignee: Apple Inc., Cupertino, CA (US)

(*) Notice: Subject to any disclaimer, the term of this patent is extended or adjusted under 35 U.S.C. 154(b) by 832 days.

This patent is subject to a terminal disclaimer.

(21) Appl. No.: 13/232,941

(22) Filed: Sep. 14, 2011

(65) Prior Publication Data

US 2013/0063285 A1 Mar. 14, 2013

(51) Int. Cl.
| | |
|---|---|
| *H03K 17/94* | (2006.01) |
| *H03M 11/00* | (2006.01) |
| *G06F 3/041* | (2006.01) |
| *G06F 3/02* | (2006.01) |
| *G09G 5/00* | (2006.01) |
| *G06F 3/038* | (2013.01) |
| *G06F 3/0354* | (2013.01) |
| *G06F 3/044* | (2006.01) |

(52) U.S. Cl.
CPC .............. *G06F 3/0213* (2013.01); *G06F 3/038* (2013.01); *G06F 3/03547* (2013.01); *G06F 3/044* (2013.01)

(58) Field of Classification Search
CPC ........... G06F 3/0202; G06F 3/02; G06F 3/04
See application file for complete search history.

(56) References Cited

U.S. PATENT DOCUMENTS

| | | |
|---|---|---|
| 4,188,136 A | 2/1980 | Bedocs |
| 4,417,294 A | 11/1983 | Herron, Jr. |
| 5,189,403 A | 2/1993 | Franz et al. |
| 5,269,004 A | 12/1993 | Comerford et al. |
| 5,341,133 A | 8/1994 | Savoy et al. |
| 5,483,261 A | 1/1996 | Yasutake |
| 5,488,204 A | 1/1996 | Mead et al. |
| 5,581,243 A | 12/1996 | Ouellette et al. |
| 5,675,361 A | 10/1997 | Santilli |

(Continued)

FOREIGN PATENT DOCUMENTS

| | | |
|---|---|---|
| CN | 1882904 A | 12/2006 |
| EP | 1 653 338 A1 | 5/2006 |

(Continued)

OTHER PUBLICATIONS

Anonymous. (2008). TouchStream LP User Interface Descriptions, located at http://fingerworks.com/ST_product.html, last visited Nov. 13, 2008, 24 pages total (submitted 14 pages).

(Continued)

*Primary Examiner* — Muhammad N Edun
*Assistant Examiner* — Jerold Murphy
(74) *Attorney, Agent, or Firm* — Morrison & Foerster LLP (57) ABSTRACT

Touch sensitive mechanical keyboards and processes for detecting touch events and key depressions on the touch sensitive mechanical keyboard are provided. The touch sensitive mechanical keyboard can include a set of individually depressible mechanical keys having a touch sensitive area located on their surface. A touch sensor can be included to detect touch events on the surface of the mechanical keys. A keypad can also be included to detect a depression of the mechanical keys. The touch sensitive mechanical keyboard can further include a processor for distinguishing detected touch events from detected key depressions. The processor can generate either a key depression command or a touch event command.

14 Claims, 7 Drawing Sheets

(56) References Cited

U.S. PATENT DOCUMENTS

| | | | |
|---|---|---|---|
| 5,707,160 A | 1/1998 | Bowen | |
| 5,736,976 A | 4/1998 | Cheung | |
| 5,821,922 A | 10/1998 | Sellers | |
| 5,825,352 A | 10/1998 | Bisset et al. | |
| 5,835,079 A | 11/1998 | Shieh | |
| 5,880,411 A | 3/1999 | Gillespie et al. | |
| 5,982,302 A | 11/1999 | Ure | |
| 6,188,391 B1 | 2/2001 | Seely et al. | |
| 6,204,839 B1 | 3/2001 | Mato, Jr. | |
| 6,310,610 B1 | 10/2001 | Beaton et al. | |
| 6,323,846 B1 | 11/2001 | Westerman et al. | |
| 6,504,530 B1 | 1/2003 | Wilson et al. | |
| 6,529,186 B1 | 3/2003 | Thayer | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,428,142 B1 | 9/2008 | Ligtenberg et al. | |
| 7,659,887 B2 * | 2/2010 | Larsen et al. | 345/170 |
| 7,663,607 B2 | 2/2010 | Hotelling et al. | |
| 7,952,038 B1 | 5/2011 | Ando et al. | |
| 7,952,566 B2 | 5/2011 | Poupyrev et al. | |
| 8,479,122 B2 | 7/2013 | Hotelling et al. | |
| 8,581,870 B2 | 11/2013 | Bokma et al. | |
| 8,933,905 B2 | 1/2015 | Bokma et al. | |
| 9,041,652 B2 * | 5/2015 | Elias | G06F 3/044 341/22 |
| 2002/0171633 A1 | 11/2002 | Brinjes | |
| 2002/0175901 A1 | 11/2002 | Gettemy | |
| 2003/0025679 A1 | 2/2003 | Taylor et al. | |
| 2003/0201982 A1 | 10/2003 | Iesaka | |
| 2004/0183786 A1 | 9/2004 | Jam | |
| 2005/0262882 A1 | 12/2005 | Moon | |
| 2006/0026521 A1 | 2/2006 | Hotelling et al. | |
| 2006/0187212 A1 | 8/2006 | Park et al. | |
| 2006/0197753 A1 | 9/2006 | Hotelling | |
| 2006/0232557 A1 | 10/2006 | Fallot-Burghardt | |
| 2006/0238510 A1 | 10/2006 | Panotopoulos et al. | |
| 2007/0063976 A1 | 3/2007 | Oga | |
| 2007/0120828 A1 | 5/2007 | Fyke | |
| 2007/0146334 A1 | 6/2007 | Inokawa | |
| 2007/0152975 A1 | 7/2007 | Ogihara et al. | |
| 2008/0006453 A1 | 1/2008 | Hotelling | |
| 2008/0024459 A1 * | 1/2008 | Poupyrev | G06F 3/016 345/173 |
| 2008/0106519 A1 * | 5/2008 | Murray | G06F 1/1626 345/169 |
| 2008/0158172 A1 | 7/2008 | Hotelling et al. | |
| 2008/0158181 A1 | 7/2008 | Hamblin et al. | |
| 2008/0202824 A1 | 8/2008 | Philipp et al. | |
| 2008/0225006 A1 | 9/2008 | Ennadi | |
| 2008/0297475 A1 | 12/2008 | Woolf et al. | |
| 2008/0309522 A1 | 12/2008 | Larsen et al. | |
| 2009/0000936 A1 | 1/2009 | Steijner | |
| 2009/0002199 A1 | 1/2009 | Lainonen et al. | |
| 2009/0027347 A1 | 1/2009 | Wakefield et al. | |
| 2009/0091536 A1 * | 4/2009 | Callaghan | 345/168 |
| 2009/0128503 A1 | 5/2009 | Grant et al. | |
| 2009/0160785 A1 | 6/2009 | Chen et al. | |
| 2009/0210568 A1 | 8/2009 | Peterson et al. | |
| 2009/0314621 A1 | 12/2009 | Hotelling | |
| 2010/0053087 A1 | 3/2010 | Dai et al. | |
| 2010/0059294 A1 | 3/2010 | Elias et al. | |
| 2010/0079309 A1 | 4/2010 | Filson et al. | |
| 2010/0123676 A1 | 5/2010 | Kirkup | |
| 2010/0148995 A1 * | 6/2010 | Elias | 341/22 |
| 2010/0149108 A1 | 6/2010 | Hotelling et al. | |
| 2010/0177057 A1 | 7/2010 | Flint et al. | |
| 2010/0259482 A1 * | 10/2010 | Ball | 345/168 |
| 2010/0271315 A1 * | 10/2010 | Bathiche | G06F 3/0202 345/173 |
| 2010/0273534 A1 * | 10/2010 | Strom | 455/566 |
| 2011/0001706 A1 | 1/2011 | Sanford et al. | |
| 2011/0141052 A1 | 6/2011 | Bernstein et al. | |
| 2011/0163971 A1 | 7/2011 | Wagner et al. | |
| 2011/0167375 A1 | 7/2011 | Kocienda | |
| 2011/0169765 A1 | 7/2011 | Aono | |
| 2011/0193817 A1 | 8/2011 | Byun et al. | |
| 2011/0227854 A1 | 9/2011 | Koya | |
| 2011/0233041 A1 | 9/2011 | Rajagopal et al. | |
| 2011/0241997 A1 | 10/2011 | Yang | |
| 2011/0267287 A1 | 11/2011 | Bartling et al. | |
| 2012/0256839 A1 | 10/2012 | Suggs | |
| 2013/0063286 A1 | 3/2013 | Elias et al. | |
| 2013/0063356 A1 | 3/2013 | Martisauskas | |
| 2013/0141342 A1 | 6/2013 | Bokma et al. | |
| 2014/0035856 A1 | 2/2014 | Bokma et al. | |
| 2015/0091867 A1 | 4/2015 | Bokma et al. | |

FOREIGN PATENT DOCUMENTS

| | | |
|---|---|---|
| JP | 2000-163031 A | 6/2000 |
| JP | 2002-342033 A | 11/2002 |
| KR | 10-0617821 B1 | 8/2006 |
| KR | 10-2008-0023871 A | 3/2008 |
| KR | 10-2009-0002648 A | 1/2009 |
| TW | 201135568 A | 10/2011 |
| TW | 201142685 A | 12/2011 |
| WO | WO-2011/018439 A1 | 2/2011 |
| WO | WO-2013/039698 A1 | 3/2013 |
| WO | WO-2013/085580 A1 | 6/2013 |

OTHER PUBLICATIONS

Non-Final Office Action mailed Oct. 6, 2011, for U.S. Appl. No. 12/333,793, filed Dec. 12, 2008, 16 pages.

Pash, A. (Nov. 7, 2006). "Hack Attack: Operate Your Mouse with Your Keyboard," *Lifehacker*, located at http://lifehacker.com/software/mouser/hack-attack-operate-your-own-mouse-with-your-keyboard-212816.php, last visited Nov. 10, 2008, seven pages (submitted four pages.).

Non-Final Office Action mailed Mar. 10, 2014, for U.S. Appl. No. 13/232,968, filed Sep. 14, 2011, 24 pages.

Final Office Action mailed Oct. 16, 2012, for U.S. Appl. No. 12/334,320, filed Dec. 12, 2008, 31 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed Dec. 5, 2012, for PCT Application No. PCT/US2012/052929, filed Aug. 29, 2012, four pages.

Final Office Action mailed Sep. 26, 2013, for U.S. Appl. No. 13/232,968, filed Sep. 14, 2011, 21 pages.

Non-Final Office Action mailed Dec. 13, 2013, for U.S. Appl. No. 14/050,103, filed Oct. 9, 2013, 8 pages.

Search Report for ROC (Taiwan) Patent Application No. 101134042, mailed Oct. 29, 2013, English Translation, one page.

Non-Final Office Action mailed Apr. 27, 2012, for U.S. Appl. No. 12/334,320, filed Dec. 12, 2008, 25 pages.

Final office Action mailed Sep. 17, 2013, for U.S. Appl. No. 12/333,793 filed Dec. 12, 2008, 20 pages.

Non-Final office Action mailed Apr. 15, 2013, for U.S. Appl. No. 12/333,793, filed Dec. 12, 2008, 19 pages.

Non-Final Office Action mailed May 9, 2013, for U.S. Appl. No. 13/232,968, filed Sep. 14, 2011, 21 pages.

Non-Final Office Action mailed Aug. 14, 2013, for U.S. Appl. No. 12/334,320, filed Dec. 12, 2008, 37 pages.

Notice of Allowance mailed Jul. 18, 2013, for U.S. Appl. No. 13/312,803, filed Dec. 6, 2011, 8 pages.

Final Office Action mailed Mar. 9, 2012, for U.S. Appl. No. 12/333,793, filed Dec. 12, 2008, 20 pages.

(56) References Cited

OTHER PUBLICATIONS

International Search Report mailed Dec. 19, 2012, for PCT Application No. PCT/US2012/053109, filed Aug. 30, 2012, three pages.
Final Office Action mailed Jun. 4, 2014, for U.S. Appl. No. 14/050,103, filed Oct. 9, 2013, 11 pages.
Non-Final office Action mailed May 22, 2014, for U.S. Appl. No. 12/333,793, filed Dec. 12, 2008, 24 pages.
Non-Final Office Action mailed Aug. 12, 2014, for U.S. Appl. No. 13/232,955, filed Sep. 14, 2011, eight pages.
Final Office Action mailed Oct. 2, 2014, for U.S. Appl. No. 13/232,968, filed Sep. 14, 2011, 25 pages.
Final Office Action mailed Nov. 3, 2014, for U.S. Appl. No. 12/333,793, filed Dec. 12, 2008, 24 pages.
Notice of Allowance mailed Sep. 10, 2014, for U.S. Appl. No. 14/050,103, filed Oct. 9, 2013, seven pages.
Notice of Allowance mailed Jan. 23, 2015, for U.S. Appl. No. 13/232,955, filed Sep. 14, 2011, six pages.
Non-Final Office Action mailed Sep. 25, 2015, for U.S. Appl. No. 14/564,735, filed Dec. 9, 2014, 15 pages.
Chinese Search Report dated Mar. 8, 2016 for CN Application No. 201280057957.9, with English translation, four pages.
Notice of Allowance mailed Mar. 28, 2016, for U.S. Appl. No. 14/564,735, filed Dec. 9, 2014, five pages.

* cited by examiner

ENABLING TOUCH EVENTS ON A TOUCH SENSITIVE MECHANICAL KEYBOARD

FIELD

This relates generally to input devices and, more specifically, to touch-sensitive input devices.

BACKGROUND

Keyboards are widely used and are generally accepted as the preferred way to provide textual input to a computing system. These keyboards typically have mechanical keys that are arranged in the so-called QWERTY layout and are configured to move independently of one another and comply with standards for key spacing and actuation force.

One of the most common keyboard types is a "dome-switch" keyboard that works as follows. When a key is depressed, the key pushes down on a rubber dome sitting beneath the key. The rubber dome collapses, giving tactile feedback to the user depressing the key, and causes a conductive contact on the underside of the dome to touch a pair of conductive lines on a Printed Circuit Board (PCB) below the dome, thereby closing the switch. A chip in the keyboard emits a scanning signal along the pairs of lines on the PCB to all the keys. When the signal in one pair of the lines changes due to the contact, the chip generates a code corresponding to the key connected to that pair of lines. This code is sent to the computer either through a keyboard cable or over a wireless connection where it is received and decoded into the appropriate key. The computer then decides what to do on the basis of the key depressed, such as display a character on the screen or perform some action. Other types of keyboards operate in a similar manner, with the main differences being how the individual key switches work. Some examples of other keyboards include capacitive-switch keyboards, mechanical-switch keyboards, Hall-effect keyboards, membrane keyboards, roll-up keyboards, and the like.

There have been numerous attempts made to introduce an alternative to the standard keyboard. The changes include, but are not limited to, non-QWERTY layouts, concave and convex surfaces, capacitive keys, split designs, membrane keys, etc. However, while such alternative keyboards may provide improved usability or ergonomics, they have failed to replace or duplicate the commercial success of the conventional mechanical keyboard.

SUMMARY

This relates to touch sensitive mechanical keyboards and processes for detecting touch events and key depressions on the touch sensitive mechanical keyboard. The touch sensitive mechanical keyboard can include a set of individually depressible mechanical keys having a touch sensitive area located on their surface. A touch sensor can be included within the keyboard to detect touch events on the surface of the mechanical keys. A keypad can also be included within the keyboard to detect a depression of one or more of the mechanical keys. In some embodiments, the touch sensitive mechanical keyboard can include a processor for distinguishing detected touch events from detected key depressions. The processor can generate either a touch event command or a key depression command. These will be described in more detail below. Processes for detecting touch events and key depressions are also disclosed.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to touch sensitive mechanical keyboards and processes for detecting touch events and key depressions on the touch sensitive mechanical keyboard. A touch event, such as a tap or a slide, may be detected when a finger or other object is placed near or in contact with a touch sensitive surface followed by a slide or when a finger or other object is placed near or in contact with the touch sensitive surface followed closely in time with a lift of the finger or object (tap). The touch sensitive mechanical keyboard can include a set of individually depressible mechanical keys having a touch sensitive area located on their surface. A touch sensor can be included within the keyboard to detect touch events on the surface of the mechanical keys. A keypad can also be included within the keyboard to detect a depression of one or more of the mechanical keys. In some embodiments, the touch sensitive mechanical keyboard can include a processor for distinguishing detected touch events from detected key depressions. The processor can generate either a touch event command or a key depression command. These will be described in more detail below. The touch sensitive mechanical keyboard can advantageously allow users to enter textual input using a device having the same look and feel of a conventional keyboard while allowing the users to enter touch events without requiring the users to remove their hands from the keyboard. Processes for detecting touch events and key depressions are also disclosed.

Although various embodiments describe touch events, it is to be understood that hover events can be detected as well.

Figure 1:
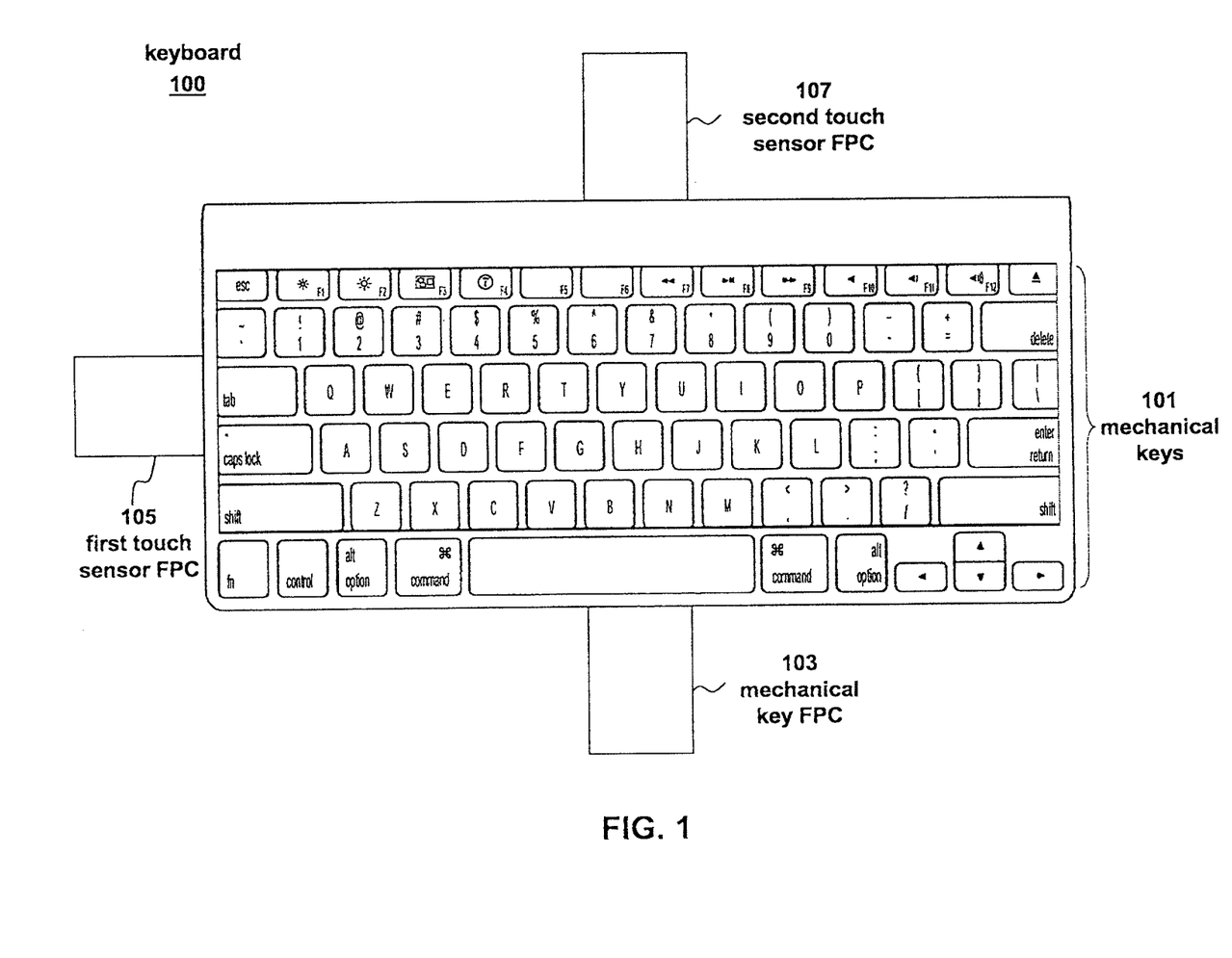
FIG. 1 illustrates a top view of an exemplary touch sensitive mechanical keyboard according to various embodiments.

FIG. 1 illustrates an exemplary touch sensitive mechanical keyboard 100 having mechanical keys 101 and a touch sensitive area located on the surfaces of mechanical keys 101. In some embodiments, keyboard 100 can be configured to have the look and feel of a conventional keyboard. For instance, each mechanical key 101 can be individually depressible, giving the user of keyboard 100 tactile feedback associated with each depression of a key. Mechanical keys 101 can be used for text entry in a manner similar to a conventional keyboard. Additionally, the touch sensitive area of keyboard 100 can be used to detect touch events, such as taps or slides, on the surface of mechanical keys 101. In this way, keyboard 100 can also be used for cursor input functions, such as point, click, scroll, drag, select, zoom, and the like, without requiring the user to remove their hands from keyboard 100. These functions, and more, can be driven by hand/finger motion while the fingers are sliding over and touching mechanical keys 101.

In some embodiments, the touch sensitive area of keyboard 100 can include the surfaces of all mechanical keys 101. In other embodiments, the touch sensitive area can include the surfaces of only a portion of mechanical keys 101. By integrating multi-touch input capability into keyboard 100 without altering its overall appearance or, more importantly, the familiar way in which it is used for typing, many of the benefits of multi-touch gesture-based input capability can be realized without having any negative impact on the user's text entry experience.

In some embodiments, keyboard 100 can further include mechanical key flexible printed circuit (FPC) 103, first touch sensor FPC 105, and second touch sensor FPC 107 for coupling keyboard 100 to a processor or host computer system. For example, mechanical key FPC 103 can be used by keyboard 100 to output information relating to the depression of one or more of mechanical keys 101. Specifically, a signal indicating that one or more mechanical keys 101 have been depressed can be transmitted through mechanical key FPC 103 to a processor. Similarly, first and second touch sensor FPCs 105 and 107 can be used to output or receive information relating to a touch sensor included within keyboard 100. For example, in some embodiments, keyboard 100 can include a capacitive touch sensor having multiple drive lines and multiple sense lines. In these embodiments, one of first touch sensor FPC 105 and second touch sensor FPC 107 can be used to receive stimulation signals for driving the drive lines while the other touch sensor FPC can be used to transmit touch signals received on the sense lines. In other embodiments, two or more of mechanical key FPC 103, first touch sensor FPC 105, and second touch sensor FPC 107 can be combined into a single FPC.

While specific examples of touch sensitive mechanical keyboard 100 are provided above, it should be appreciated that the principals described in the present disclosure can similarly be applied to touch sensitive mechanical keyboards having other features and configurations.

Figure 2:
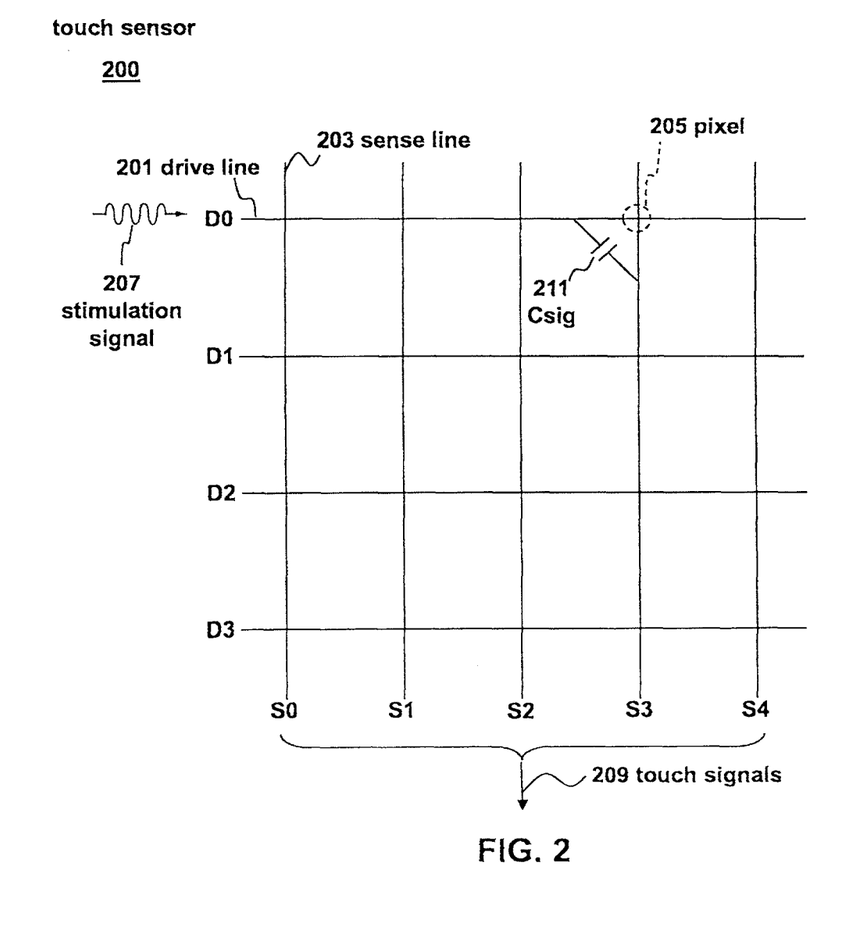
FIG. 2 illustrates an exemplary touch sensor panel that can be used with a touch sensitive mechanical keyboard according to various embodiments.

FIG. 2 illustrates a portion of an exemplary touch sensor 200 that can be used to detect touch events on touch sensitive mechanical keyboard 100. Touch sensor 200 can include an array of pixels 205 that can be formed at the crossing points between rows of drive lines 201 (D0-D3) and columns of sense lines 203 (S0-S4). Each pixel 205 can have an associated mutual capacitance Csig 211 formed between the crossing drive lines 201 and sense lines 203 when the drive lines are stimulated. The drive lines 201 can be stimulated by stimulation signals 207 provided by drive circuitry (not shown) and can include an alternating current (AC) waveform. The sense lines 203 can transmit touch or sense signals 209 indicative of a touch at the panel 200 to sense circuitry (not shown), which can include a sense amplifier for each sense line.

To sense a touch at the touch sensor 200, drive lines 201 can be stimulated by the stimulation signals 207 to capacitively couple with the crossing sense lines 203, thereby forming a capacitive path for coupling charge from the drive lines 201 to the sense lines 203. The crossing sense lines 203 can output touch signals 209, representing the coupled charge or current. When a user's finger (or other object) touches the panel 200, the finger can cause the capacitance Csig 211 to reduce by an amount ΔCsig at the touch location. This capacitance change ΔCsig can be caused by charge or current from the stimulated drive line 201 being shunted through the touching finger to ground rather than being coupled to the crossing sense line 203 at the touch location. The touch signals 209 representative of the capacitance change ΔCsig can be transmitted by the sense lines 203 to the sense circuitry for processing. The touch signals 209 can indicate the pixel where the touch occurred and the amount of touch that occurred at that pixel location. As discussed above, in some embodiments, stimulation signals 207 and touch signals 209 can be received and transmitted via first and second touch sensor FPCs 105 and 107.

While the embodiment shown in FIG. 2 includes four drive lines 201 and five sense lines 203, it should be appreciated that touch sensor 200 can include any number of drive lines 201 and any number of sense lines 203 to form the desired number and pattern of pixels 205. Additionally, while the drive lines 201 and sense lines 203 are shown in FIG. 2 in a crossing configuration, it should be appreciated that other configurations are also possible to form the desired pixel pattern. While FIG. 2 illustrates mutual capacitance touch sensing, other touch sensing technologies may also be used in conjunction with embodiments of the disclosure, such as self-capacitance touch sensing, resistive touch sensing, projection scan touch sensing, and the like. Furthermore, while various embodiments describe a sensed touch, it should be appreciated that the touch sensor 200 can also sense a hovering object and generate hover signals therefrom.

Figure 3:
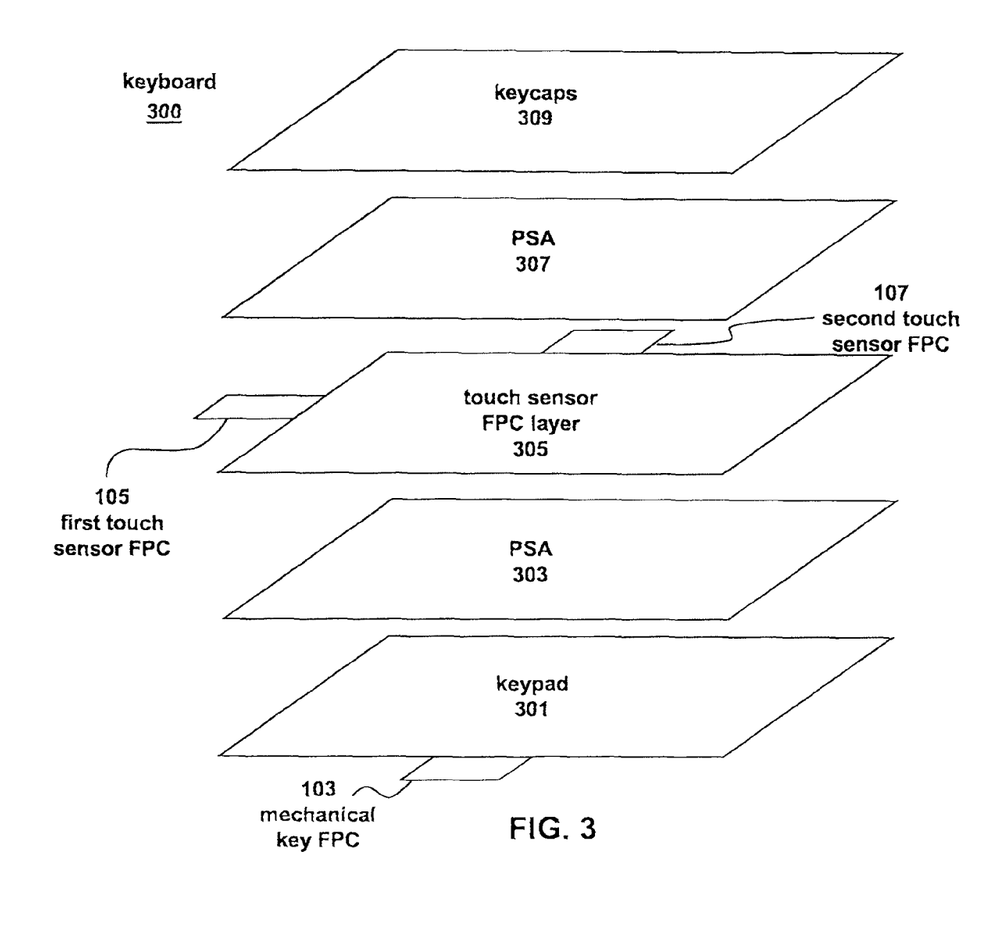
FIG. 3 illustrates an exploded view an exemplary touch sensitive mechanical keyboard according to various embodiments.

FIG. 3 illustrates an exploded view of an exemplary touch sensitive mechanical keyboard 300. Touch sensitive mechanical keyboard 300 is an example of touch sensitive mechanical keyboard 100 and includes a touch sensor similar to touch sensor 200 for detecting touch events on the surface of some or all of the mechanical keys (not shown) of keyboard 300. Keyboard 300 can further include keypad 301 for detecting a depression of one or more of the mechanical keys of keyboard 300. In some embodiments, keypad 301 can include multiple dome-switches that are configured to couple pairs of conductive lines on a PCB below each dome to detect depression of one or more of the mechanical keys. Keyboard 300 can further include a processor (not shown) that emits a scanning signal along the pairs of lines on the PCB to all the keys. When the signal in one pair of the lines changes due to coupling by the dome-switch, the processor generates a code corresponding to the key connected to that pair of lines. This information can be transmitted through mechanical key FPC 103 to a processor or computing device, such as a laptop computer, desktop computer, mobile device, mobile phone, or the like.

In other embodiments, keypad 301 can detect depression of mechanical keys using other technologies, such as capacitive-switch circuitry, mechanical-switch circuitry, Hall-effect sensors, and the like. It should be appreciated that any known method for detecting depression of mechanical keys can be used.

Keyboard 300 can further include a touch sensor FPC layer 305 containing touch sensor circuitry for detecting touch events on the surface of the mechanical keys. Touch sensor FPC layer 305 can be applied to keypad 301 using an adhesive layer, such as pressure sensitive adhesive (PSA) 303. Touch sensor FPC layer 305 can be located beneath keycaps 309, and can be applied to keycaps 309 using an adhesive layer, such as pressure sensitive adhesive (PSA) 307. Keycaps 309 can include multiple discrete portions forming the front surface of the mechanical keys. The surface of keycaps 309 can include printed or engraved letters, symbols, or numbers. When depressed, the keycaps 309 can directly or indirectly contact the keypad 301 through touch sensor FPC layer 305, causing keypad 301 to detect the depression of the mechanical keys.

In some embodiments, touch sensor FPC layer 305 can include clusters of intersecting drive lines and sense lines forming sensor nodes similar to drive lines 201, sense lines 203, and pixels 205 of touch sensor 200 shown in FIG. 2. Each mechanical key can have associated therewith any number of sensor nodes depending on the desired touch resolution. For example, the drive lines and sense lines can form a grid beneath each keycap 309 to detect touch events along the surface of keycaps 309. To allow the depression of the mechanical keys to be detected by keypad 301, touch sensor FPC layer 305 can be configured to allow a portion of keycaps 309 to directly or indirectly contact keypad 301. For instance, in some embodiments, a plunger located on the bottom of keycaps 309 can be allowed to protrude through touch sensor FPC layer 305. In these embodiments, touch sensor FPC layer 305 can be formed from a stretchable or deformable material to allow depression of the keys through FPC layer 305. Alternatively, in other embodiments, FPC layer 305 can be positioned below keypad 301. Since, in these embodiments, key caps 309 can directly or indirectly contact keypad 301 without protruding through FPC layer 305, FPC layer 305 can be formed from non-stretchable or non-deformable materials.

Touch sensor FPC layer 305 can further include first and second touch sensor FPCs 105 and 107 for outputting and receiving signals associated with the operation of touch sensor FPC layer 305. For example, one of first touch sensor FPC 105 and second touch sensor FPC 107 can be used to receive stimulation signals for driving the drive lines of touch sensor FPC layer 305 while the other touch sensor FPC can be used to transmit touch signals received on the sense lines of touch sensor FPC layer 305. These signals can be transmitted to, and received from, a processor or other computing device, such as a laptop computer, desktop computer, and the like. In some embodiments, the processor coupled to touch sensor FPC layer 305 can be the same processor coupled to keypad 301.

As discussed above, keyboards 100 and 300 can be capable of receiving both mechanical key depression input and touch event input. As a result, keyboards 100 and 300 can output two streams of information: a first data stream containing signals representative of a detected depression of one or more mechanical keys via mechanical key FPC 103 and a second data stream containing signals representative of one or more detected touch events via first touch sensor FPC 105 or second touch sensor FPC 107. When a user contacts a surface of a mechanical key, touch sensor FPC layer 305 can report a detected touch event. However, when a key is depressed, both touch sensor FPC layer 305 and keypad 301 can report a detected event. Specifically, touch sensor FPC layer 305 can report a detected touch event and keypad 301 can report a detected key depression.

Figure 4:
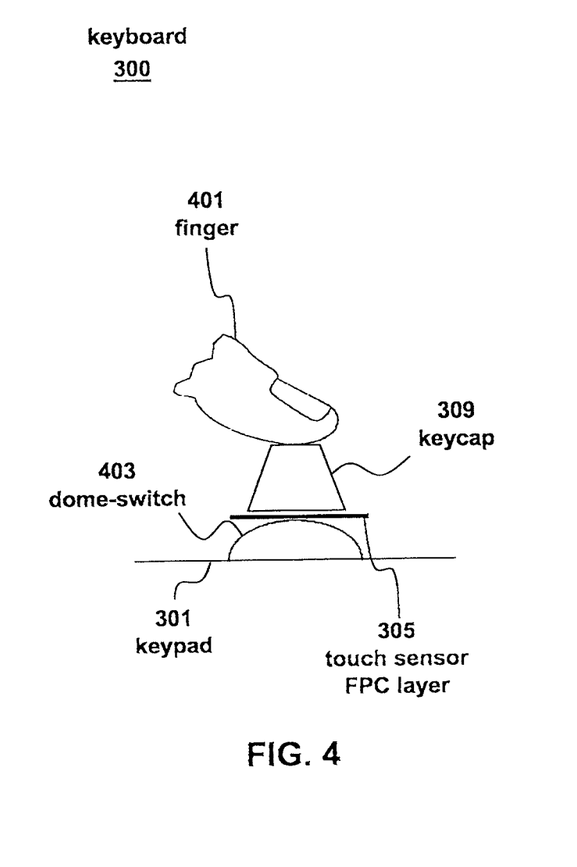
FIG. 4 illustrates a user performing a touch event on a surface of a key of a touch sensitive mechanical keyboard according to various embodiments.

To illustrate, FIG. 4 shows a user inputting a touch event by applying finger 401 to the surface of keycap 309 without exerting sufficient downward force to depress dome-switch 403. This action can cause the touch sensor, such as touch sensor FPC layer 305, to detect the touch event and transmit a signal indicative of a detected touch event via touch sensor FPC 105 or 107. Since the dome-switch 403 is not depressed, the keypad may not transmit a signal indicative of a depression of mechanical key 101. Similarly, when a user enters a hover event by placing their finger near the surface of keycap 309, the touch sensor may transmit a signal indicative of a detected hover event via touch sensor FPC 105 or 107. Additionally, since the dome-switch 403 is not depressed, the keypad may not transmit a signal indicative of a depression of mechanical key 101.

Figure 5:
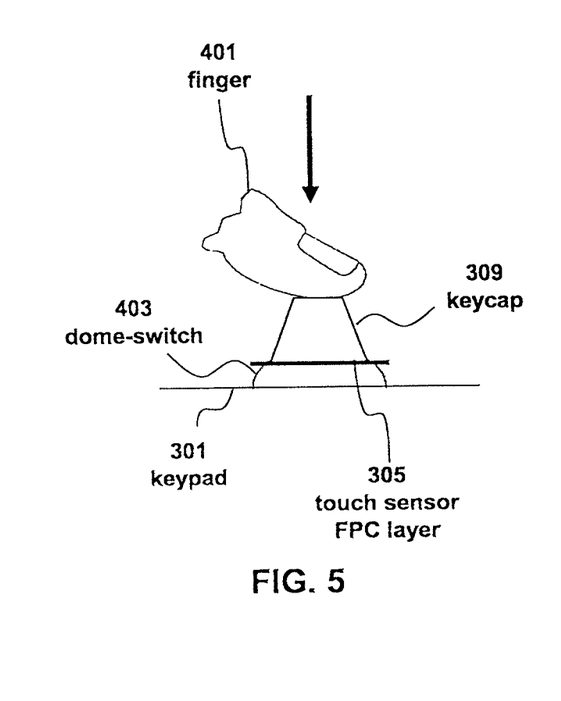
FIG. 5 illustrates a user depressing a key of a touch sensitive mechanical keyboard according to various embodiments.

FIG. 5 shows a user entering a key stroke by applying finger 401 to the surface of keycap 309 and exerting downward force sufficient to depress dome-switch 403. This action can cause dome-switch 403 to transmit a signal indicative of a depression of mechanical key 101 via mechanical key FPC 103. However, since the user's finger 401 also contacts keycap 309, the touch sensor, such as touch sensor FPC layer 305, can detect the touch event and transmit a signal indicative of a detected touch event via touch sensor FPC 105 or 107. Thus, in this example, both a touch event signal and a key depression signal can be transmitted from the touch sensitive mechanical keyboard.

Figure 6:
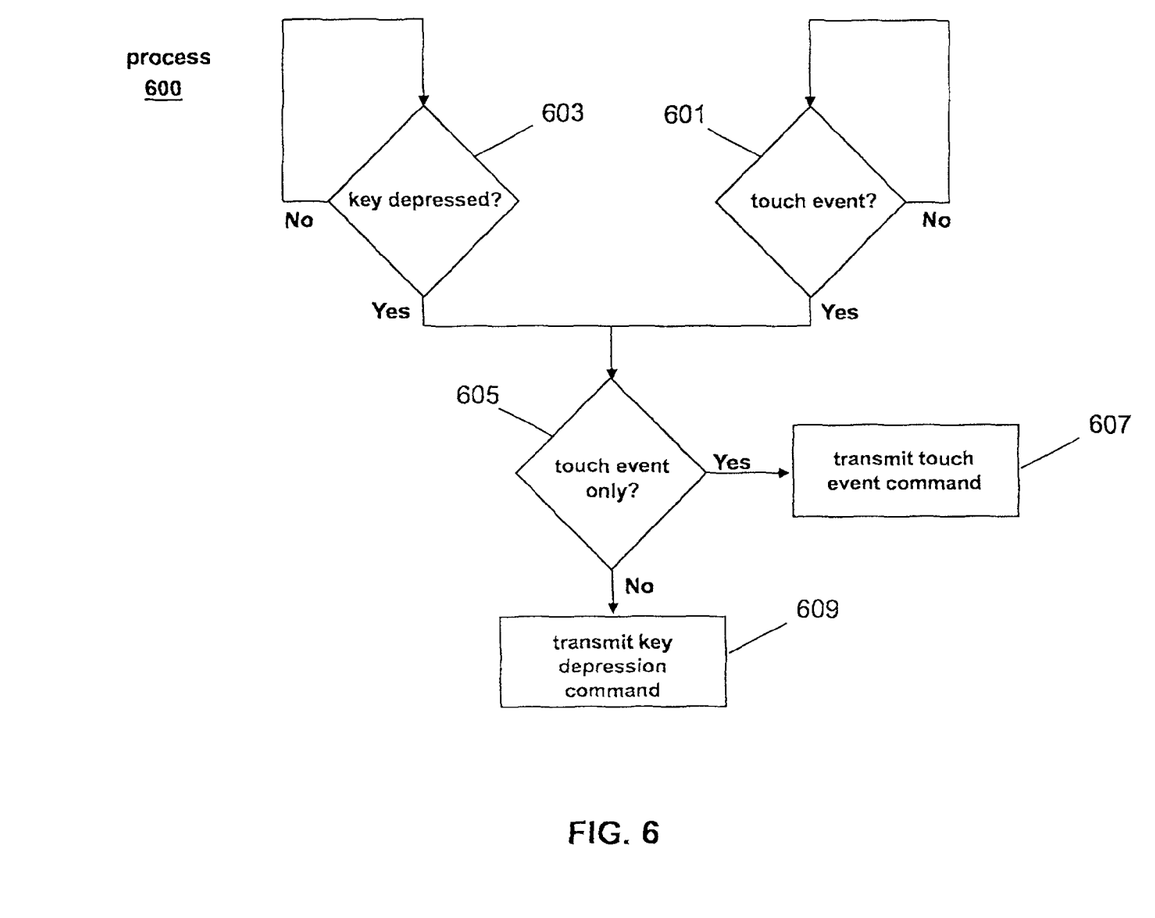
FIG. 6 illustrates an exemplary process for detecting touch events and key depressions of a touch sensitive mechanical keyboard according to various embodiments.

FIG. 6 shows an exemplary process 600 for detecting touch events and key depressions on a touch sensitive mechanical keyboard similar or identical to touch sensitive mechanical keyboards 100 or 300. Additionally, process 600 can provide a way to distinguish between touch events and key depressions on a touch sensitive mechanical keyboard.

At block 601 of process 600, the surface of some or all of the mechanical keys of a touch sensitive mechanical keyboard can be monitored for a touch event. In some embodiments, a touch sensor similar or identical to touch sensor 200 or touch sensor FPC layer 305 can be used to detect touch events on or near the surface of mechanical keys 101. If no touch event is detected, the process can repeat back to block 601 where the surface of some or all of mechanical keys 101 can continue to be monitored. However, if a touch event is detected, the process can proceed to block 605. In some embodiments, if a touch event is detected, the touch sensor of the touch sensitive mechanical keyboard can transmit a signal indicating that a touch event has occurred as well as information relating to the touch event (e.g., location, duration, motion, or the like). For example, a touch event signal can be transmitted by touch sensor 200 or touch sensor FPC layer 305 to a processor via first or second touch sensor FPC 105 or 107. The processor can be located within the touch sensitive mechanical keyboard or can be located separate from the touch sensitive mechanical keyboard.

Similarly, at block 603 of process 600, the mechanical keys of a touch sensitive mechanical keyboard can be monitored for a depression of one or more of the mechanical keys. In some embodiments, a keypad similar or identical to keypad 301 can be used to detect a depression of one or more mechanical keys 101 of keyboard 100 or 300. If no key depression is detected, the process can repeat back to block 603 where the mechanical keys 101 can continue to be monitored. However, if a key depression is detected, the process can proceed to block 605. In some embodiments, if a depression of one or more mechanical keys are detected, the keypad of the touch sensitive mechanical keyboard, such as keyboard 100 or 300, can transmit a signal indicating that a key depression has occurred as well as information relating to the key depression (e.g., key depressed, duration, or the like). For example, a key depression signal can be transmitted by keypad 301 to a processor via mechanical key FPC 103. In some embodiments, the processor can be the same processor that receives the touch signal from touch sensor 200 or touch sensor FPC layer 305 via first or second touch sensor FPC 105 or 107. In other embodiments, a separate processor can be used.

At block 605, it can be determined whether only a touch event has been detected or if both a touch event and a key depression have been detected. If a touch event has been detected and no key depression has been detected, the process can proceed to block 607. However, if both a touch event and key depression have been detected, the process can proceed to block 609.

In some embodiments, a processor located in a host computer, in the keyboard assembly, or elsewhere, can be used to determine if only a touch event has been detected, or if both a touch event and a key depression have been detected. The processor can be the same processor used to receive the touch event signal and key depression signal described above. Alternatively, the processor can be a different processor than that used to receive the touch event signal and key depression signal described above. For example, in some embodiments, the processor can be coupled to receive touch and key depression signals from the sensors within touch sensitive mechanical keyboard (e.g., keyboard 100 or 300) via a connector (e.g., FPCs 103, 105, and 107).

In some embodiments, upon receipt of a signal indicating a touch event has been detected, the processor can wait a threshold length of time for a signal indicating a key depression has been detected. This can be done because when a user depresses a key to input a character, number, or symbol, the user's finger can contact the surface of the key, causing the touch sensor circuitry to detect the touch event. The touch sensor circuitry can then send a signal to the processor indicating a touch event has been detected. However, since the user is attempting to enter a keystroke, the key can also be depressed a short time after the user's finger contacts the surface of the key. This can cause the keypad circuitry to detect the depression of the key and transmit a signal indicating that a key depression has been detected. Thus, to prevent the generation of excessive or erroneous signals, the processor may wait a threshold length of time after receiving the touch event signal to account for the delay between the user touching the key and the key being depressed. The threshold length of time may have a duration that is sufficiently long to allow the user to fully depress the key without causing a noticeable delay between the time the user presses the key and the time a computer system reacts to the input. Thus, if the key depression signal is received within the threshold length of time after receiving the touch event signal, the input can be interpreted as a key depression and the process can proceed to block 609. If, however, the key depression signal is not received within the threshold length of time after receiving the touch event signal, the input can be interpreted as a touch event and the process can proceed to block 607.

It should be appreciated that the determination performed at block 605 can be done on a per-key basis. For example, if a touch event is detected on a particular key (e.g., the "F" key), it can be determined whether the same key (the "F" key) has been depressed. If the same key has been depressed, the process can proceed to block 609. If, however, a different key is depressed (e.g., the "R" key), the input can be interpreted as a touch event on the "F" key and the process can proceed to block 607. In this way, the touch sensitive mechanical keyboard can detect touch events on one portion of the keyboard while receiving textual input at another portion of the keyboard. For the different depressed key (e.g., the "R" key), the process 600 can repeat in order to interpret its input and eventually proceed to block 609.

At block 607, a touch event command, such as a tap or slide event command, can be transmitted. In some embodiments, a processor can transmit a signal to another processor or host computer indicating that a tap or slide has been received by the touch sensitive mechanical keyboard.

At block 609, a key depression command identifying the depressed key can be transmitted. In some embodiments, a processor can transmit a signal to another processor or host computer indicating that a key depression has been received by the touch sensitive mechanical keyboard.

Figure 7:
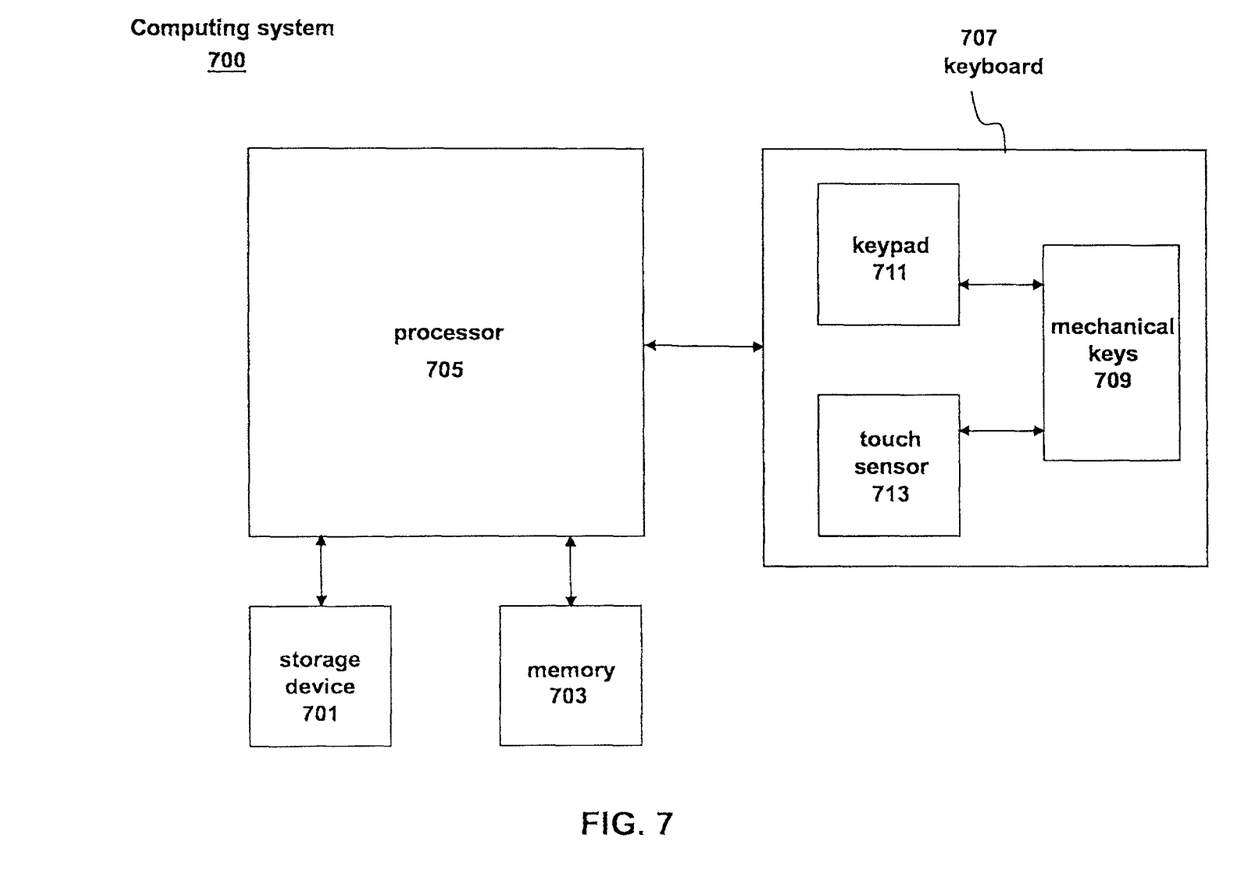
FIG. 7 illustrates an exemplary system including an input device according to various embodiments.

One or more of the functions relating to the detection of a touch event or key depression can be performed by a computing system similar or identical to computing system 700 shown in FIG. 7. Computing system 700 can include instructions stored in a non-transitory computer readable storage medium, such as memory 703 or storage device 701, and executed by processor 705. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Computing system 700 can further include touch sensitive mechanical keyboard 707 coupled to processor 705. Touch sensitive mechanical keyboard 707 can be similar or identical to touch sensitive mechanical keyboard 100 or 300 described above. In some embodiments, keyboard 707 can include mechanical keys 709, keypad 711, and touch sensor 713 for detecting touch events and key depressions and for providing signals indicating a detection of a touch event or key depression to processor 705. In some embodiments, mechanical keys 709 can be similar or identical to mechanical keys 101, keypad 711 can be similar or identical to keypad 301, and touch sensor 713 can be similar or identical to touch sensor 200 or touch sensor FPC layer 305, described above. Processor 705 can receive the detection signals from keyboard 707 and interpret them as touch events or key depressions in a manner similar or identical to that described above with respect to process 600.

It is to be understood that the computing system is not limited to the components and configuration of FIG. 7, but can include other or additional components in multiple configurations according to various embodiments. Additionally, the components of computing system 700 can be included within a single device, or can be distributed between two or more devices. For example, while processor 705 is shown separate from keyboard 707, in some embodiments, processor 705 can be located within keyboard 707.

Figure 8:
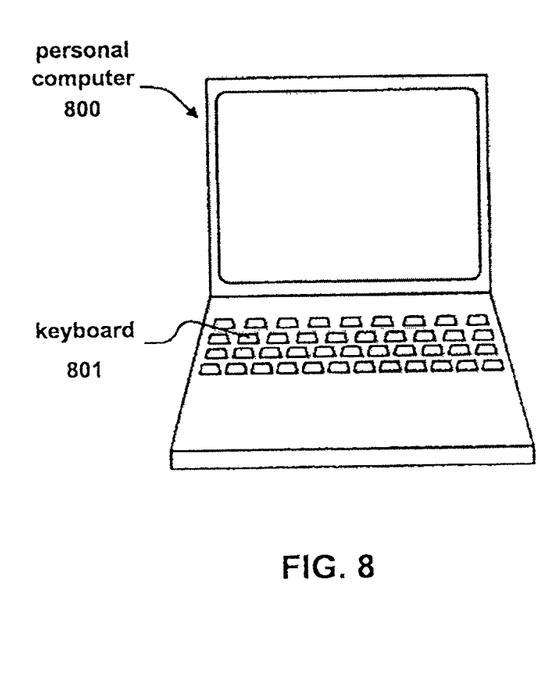
FIG. 8 illustrates an exemplary personal computer including an input device according to various embodiments.

FIG. 8 illustrates an exemplary personal computer 800 that can include a touch sensitive mechanical keyboard 801 according to various embodiments.

Figure 9:
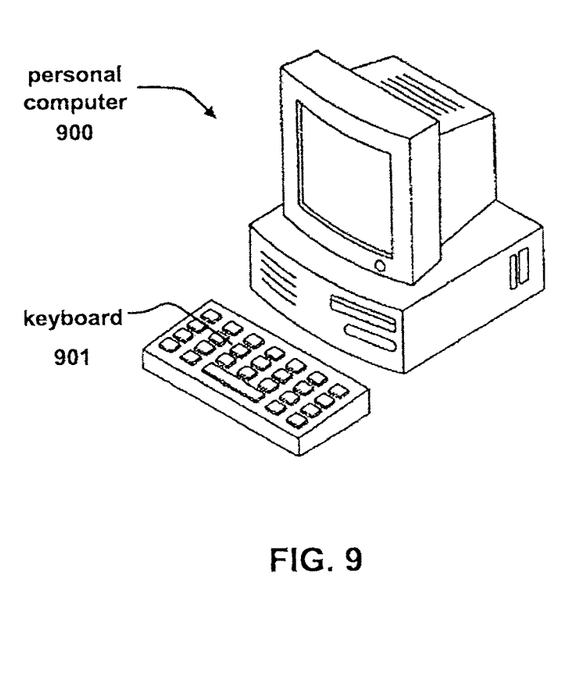
FIG. 9 illustrates another exemplary personal computer including an input device according to various embodiments.

FIG. 9 illustrates another exemplary personal computer 900 that can include a touch sensitive mechanical keyboard 901 according to various embodiments.

The personal computers of FIGS. 8 and 9, as well as other computing devices, can receive both touch input and mechanical key input by utilizing a touch sensitive mechanical keyboard according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method for generating a keyboard command signal, the method comprising:
    monitoring a plurality of depressible keys for a plurality of touch events on a surface of one or more of the plurality of depressible keys;
    monitoring the plurality of depressible keys for a depression of a key of the plurality of depressible keys; and
    generating one or more command signals based on the monitoring of the plurality of depressible keys for touch events on the surface of one or more of the plurality of depressible keys and the monitoring of the plurality of depressible keys for the depression of the key of the plurality of depressible keys,
    wherein each of the one or more command signals is a touch event command signal or a key depression command signal and each touch event corresponds to one respective command signal of the one or more command signals,
    wherein a touch event command signal is generated in response to detecting a first touch event on the surface of the one or more of the plurality of depressible keys and detecting the depression of a key of the plurality of depressible keys within a threshold length of time from detecting the first touch event, wherein the one or more of the plurality of depressible keys at which the first touch event is detected is different than the depressed key.

2. The method of claim 1 further comprising:
    receiving a touch event signal in response to a detection of a second touch event on the surface of one or more of the plurality of depressible keys; and
    receiving a key depression signal in response to the detection of the depression of the key of the plurality of depressible keys.

3. The method of claim 2, wherein generating one or more command signals further comprises:
    generating the touch event command signal in response to receiving the touch event signal without receiving the key depression signal within a threshold length of time from receiving the touch event signal; and
    generating the key depression command signal in response to receiving the key depression signal within the threshold length of time from receiving the touch event signal
    wherein the one or more of the plurality of depressible keys at which the second touch event occurs is at the depressed key.

4. The method of claim 2, wherein the second touch event occurs at the depressed key.

5. A method for generating a keyboard command signal, the method comprising:
    receiving a touch event signal indicating that a touch event has been detected on a surface of a first key of a plurality of depressible keys;
    determining whether a key depression signal is received within a threshold length of time from receiving the touch event signal; and
    in response to the touch event signal, generating a command signal based on the determination, wherein the command signal is a touch event command signal or a key depression command signal, and wherein generating the command signal comprises:
    generating the touch event command signal in response to a determination that the threshold length of time elapsed without receiving the key depression signal; and
    generating the touch event command signal in response to a determination that the key depression signal is received within the threshold length of time from receiving the touch event signal, wherein the key depression signal indicates that a second key of the plurality of depressible keys has been depressed, and the first key and the second key are different keys.

6. The method of claim 5, wherein the key depression signal is received from a switch sensor operable to detect the depression of the first key of the plurality of depressible keys.

7. The method of claim 5, wherein generating the command signal comprises generating a key depression command signal in response to the key depression signal being received within the threshold length of time from receiving the touch event signal, the key depression command signal indicating that both the touch event has occurred and the first key has been depressed.

8. The method of claim 5, wherein the touch event signal is received from an array of capacitive sensors.

9. A keyboard comprising:
    a plurality of depressible keys;
    a plurality of switch sensors operable to detect a depression of one or more of the plurality of depressible keys;
    an array of capacitive sensors operable to detect a touch event on a surface of one or more of the plurality of depressible keys opposite the array of capacitive sensors; and a processor configured to receive a touch event signal indicating that a touch event has been detected by the array of capacitor sensors on the surface of the plurality of depressible keys, the processor further configured to receive a key depression signal indicating that a depression of a key of the plurality of depressible keys has been detected by the plurality of switch sensors, wherein the processor is operable to generate a command signal based at least in part on the touch event signal, and the command signal is a touch event command signal or a key depression command signal, wherein the processor is further operable to generate the touch event command signal in response to receiving the touch event signal, wherein the touch event occurs coextensive in time with the key of the plurality of depressible keys being depressed, and wherein the touch event and the depression occur at different keys of the plurality of depressible keys; and wherein the processor is further operable to generate the key depression command signal in response to receiving the key depression signal coextensive in time with the touch event signal, wherein the touch event and the depression occur at a same key of the plurality of depressible keys.

10. The keyboard of claim 9, wherein the processor is further operable to generate the touch event command signal in response to receiving the touch event signal without receiving the key depression signal within the threshold length of time from receiving the touch event signal.

11. The keyboard of claim 9, wherein the keyboard is incorporated within a computing device.

12. The keyboard of claim 9, wherein the keyboard is coupled to a computing device.

13. An apparatus comprising:
a surface having a plurality of locally collapsible areas;
a plurality of switch sensors operable to detect a depression of one or more of the locally collapsible areas;
an array of capacitive sensors operable to detect a touch event on the surface; and
a processor configured to receive a touch event signal indicating that a touch event has been detected by the array of capacitor sensors on a surface of the plurality of locally collapsible areas, the processor further configured to receive a depression signal indicating that a locally collapsible area of the plurality of locally collapsible areas has been depressed, wherein the processor is operable to generate a command signal in response to and based at least in part on the touch event signal, wherein the command signal is a touch event command signal or a key depression command signal, wherein the processor is further operable to:
generate the key depression command signal in response to receiving the depression signal wherein the touch event occurs coextensive in time with the locally collapsible area being depressed, and the touch event and the depression occur at a same locally collapsible area; and
generate the touch event command signal in response to receiving the touch event signal, wherein the touch event occurs coextensive in time with the locally collapsible area being depressed, and the touch event and the depression occur at different locally collapsible areas.

14. The apparatus of claim 13, wherein the touch event and the depression occur at the same locally collapsible area.

* * * * *